April 24, 1956 — O. SERVAIS — 2,742,840
ROTARY CULTIVATOR
Filed April 13, 1950 — 2 Sheets-Sheet 1
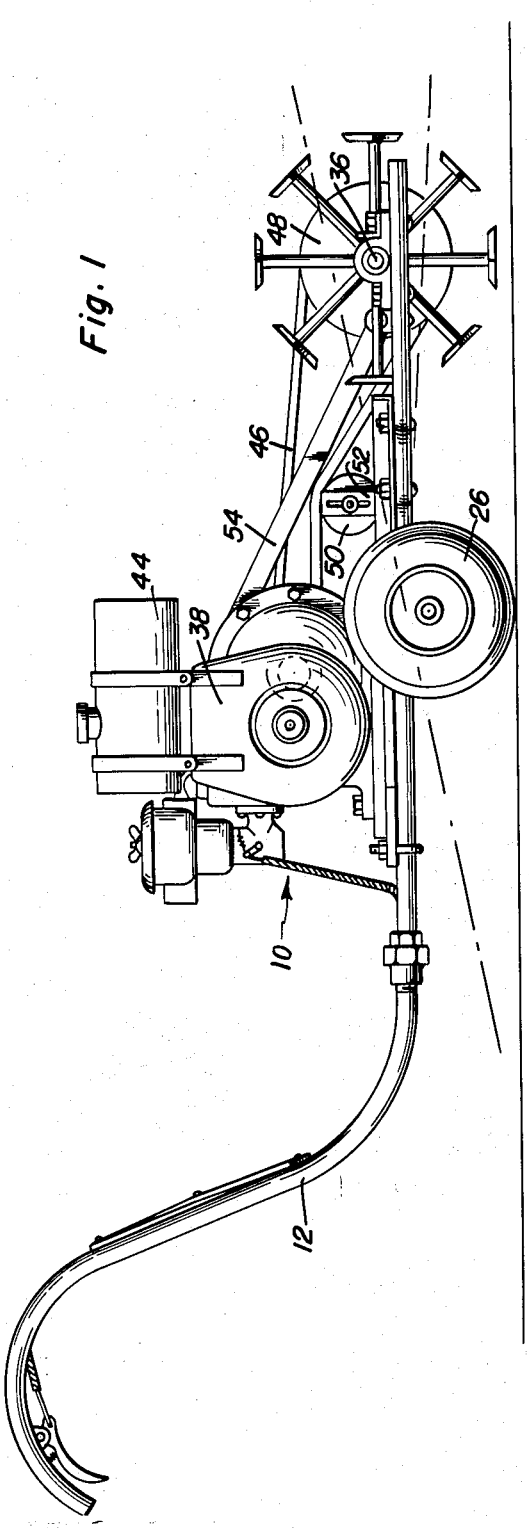
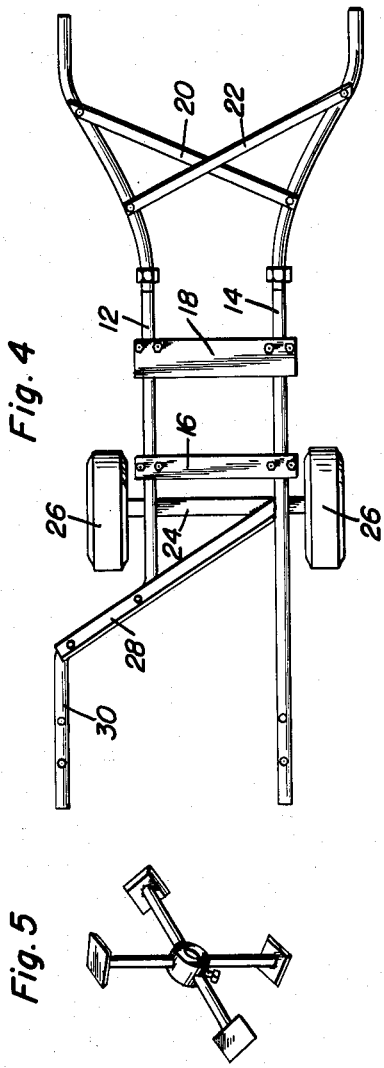
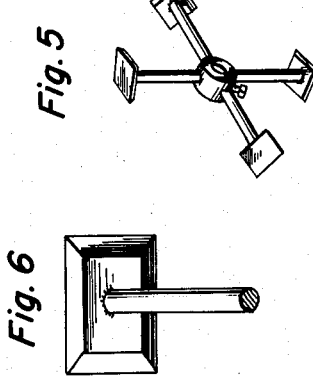
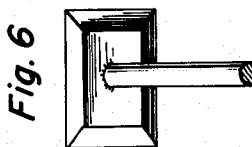
Omer Servais
INVENTOR.

April 24, 1956

O. SERVAIS 2,742,840

ROTARY CULTIVATOR

Filed April 13, 1950

Omer Servais
INVENTOR.

United States Patent Office 2,742,840
Patented Apr. 24, 1956

2,742,840

ROTARY CULTIVATOR

Omer Servais, West De Pere, Wis.

Application April 13, 1950, Serial No. 155,701

1 Claim. (Cl. 97—40)

This invention relates to agricultural equipment, and more particularly to a cultivator having a prime mover for operating the cultivating tool so as to drive the cultivator along the surface of the soil.

An object of this invention is to provide a cultivator having a suitable prime mover such as a gasoline engine, or the like, mounted thereon which is operatively connected to a novel cultivating tool which, when the tool is driven by the prime mover, will, upon engagement with the surface of the ground, cause the cultivator to move along the surface thereof.

A further object of this invention is to provide a novel cultivator tool consisting of a plurality of cylindrical elements mounted on a shaft having cutting blades axially extending therefrom and secured thereto.

Still further objects of the invention reside in the provision of a cultivator that is strong, durable, highly efficient in operation, simple in construction and manufacture, the same being easily and cheaply produced, and which is quite easy to handle while being very maneuverable.

These, together with the various ancillary objects of the invention which will become apparent as the following description proceeds, are attained by this cultivator, a preferred embodiment of which has been illustrated in the accompanying drawings, by way of example only, wherein:

Figure 1 is a side elevational view of the cultivator comprising the present invention;

Figure 4 is a top plan view showing the construction of the frame elements comprising the supporting members for the other elements of the invention;

Figure 5 is a perspective view of a unit of the cultivator tool of the present invention;

Figure 6 is a perspective view of one of the elements of the cutting tool.

Figure 2:
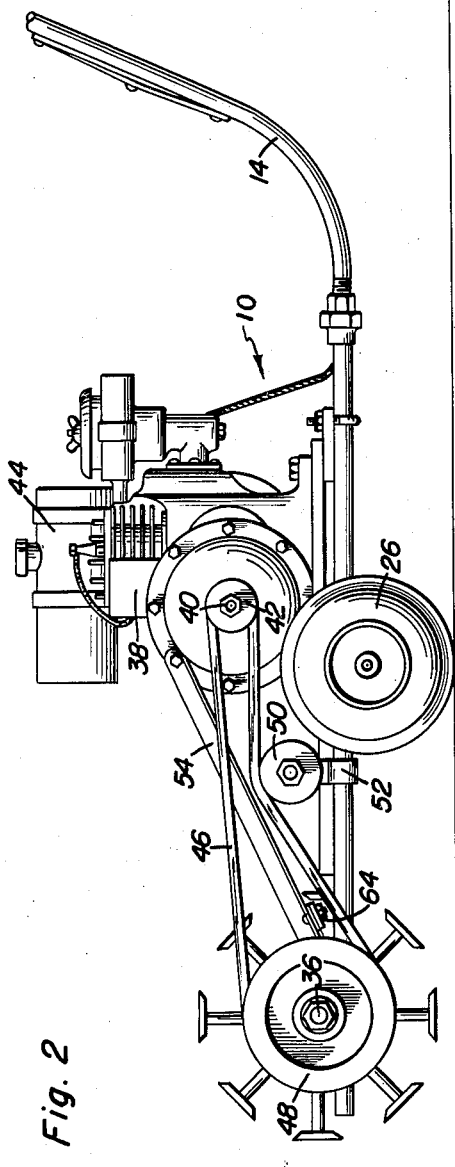
Figure 2 is another side elevational view of the invention shown in Figure 1 but looking from the other side of the machine.
Figure 3:
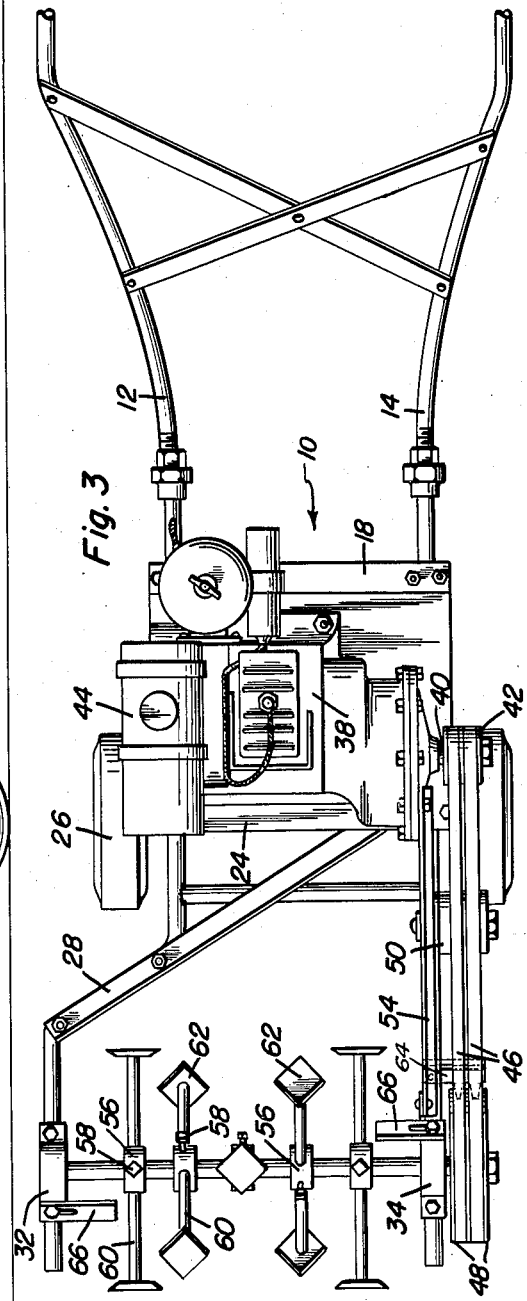
Figure 3 is a top plan view of the cultivator.

With continued reference to the accompanying drawings, wherein like reference numerals designate similar parts throughout the various views, the reference numeral 10 generally designates the cultivator comprising the present invention. The cultivator 10 consists of a pair of tubular elements 12 and 14 which are held in spaced relationship by a pair of transverse supports 16 and 18. A pair of cross braces 20 and 22 are also provided adjacent one end of each of the tubular frame members 12 and 14 so as to rigidify the structure. As can be readily seen from an inspection of Figures 1 and 2, the tubular frame elements 14 and 16 are curved upwardly to form suitable handles for the machine.

Journaled in suitable bearing brackets attached to the frame members 12 and 14 is a shaft 24 on which wheels 26 are mounted for rollingly supporting the frame of the machine. A transverse brace 28 is secured medially the frame member 14 and to the end of the frame member 12 so as to be guidingly disposed relative to the longitudinal axis of the cultivator. A tubular frame element 30 is secured to the free end of the diagonal brace 28 and together with the free end of the frame member 14 provides a support for bearing brackets 32 and 34 in which the shaft 36 forming one part of the cultivator tool is suitably journaled. Thus, the frame elements define an offset frame which forms a highly advantageous feature of the invention.

Mounted on the supporting members 16 and 18 is a prime mover 38 which rotates shaft 40 to which the pulley wheels 42 are secured. A fuel tank 44 is provided for supplying fuel such as gasoline to the prime mover 38.

By means of belts 46, the pulley wheels 42 are drivingly connected to pulley wheels 48 mounted on the shaft 36. An idler pulley wheel 50 is adjustably supported by a bracket 52 secured to the frame member 14. The idler pulley 50 may be adjusted so as to predetermine the tension in the belts 46. In addition, a diagonal brace 54 is terminally secured to the prime mover 38 and to the bearing bracket 34 for rigidifying the structure. It is to be noted that the drive wheel 48 also acts as a depth gauge to prevent the cutting tools from penetrating beyond the extension distance of the cutting tools and beyond the size of the drive wheel.

These cutting tools mounted on the shaft 36 comprise a plurality of cylindrical members 56 which are detachably held in place by suitable set screws such as those indicated at 58. Axially extending from the cylindrical elements 56 are rods 60 at the free ends of which are secured plates 62 which are beveled at their edges and so disposed as to permit a corner of each to engage the soil upon contact with the ground.

Mounted on the frame member 14 and projecting into the belts is a pulley groove cleaner 64. Attached to the bearing brackets are sharpened steel blades 66 which cut weeds or accumulations tending to wind on the drive shaft 36.

Since, from the foregoing, the construction and advantages of this cultivator are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

A cultivator comprising a frame including a pair of spaced, parallel frame members having forward and rearward ends, a pair of wheels journaled on said frame members intermediate their ends, handle means detachably secured to the rearward ends of said frame members, the forward end of one of said frame members terminating short of the forward end of the other frame member, a transverse brace secured at one end to the other of said frame members and intermediate its ends to the forward end of said one frame member, a frame element secured to the free end of said transverse brace and extending longitudinally of said one frame member, to provide an offset forward end for the frame, a shaft extending transversely across the forward end of said frame and being rotatably journaled thereon, rotary cutter means on said shaft and driving means on said frame for rotating the shaft, said driving means including a ground engaging and depth control pulley mounted on said shaft, and means on said frame for removing soil from said pulley.

(References on following page)

References Cited in the file of this patent

UNITED STATES PATENTS

| | | |
|---|---|---|
| 106,195 | Newsom | Aug. 9, 1870 |
| 1,383,294 | Gardner | July 5, 1921 |
| 1,699,151 | Miller et al. | Jan. 15, 1929 |
| 1,816,210 | Chong et al. | July 28, 1931 |
| 1,896,391 | Chong et al. | Feb. 7, 1933 |
| 2,040,068 | Ziegler | May 5, 1936 |
| 2,244,099 | Chase | June 3, 1941 |
| 2,250,391 | Ober | July 22, 1941 |
| 2,508,612 | Kimbler | May 23, 1950 |
| 2,630,747 | Mintz | Mar. 10, 1953 |
| 2,633,789 | Ober | Apr. 7, 1953 |